(12) United States Patent
Mazet et al.

(10) Patent No.: US 12,066,131 B2
(45) Date of Patent: Aug. 20, 2024

(54) FITTING ASSEMBLY COMPRISING A SOCKET AND AN INTERCHANGEABLE RING

(71) Applicant: Raccords et Plastiques Nicoll, Cholet (FR)

(72) Inventors: Yannick Mazet, Cholet (FR); Samuel Stepka, Cholet (FR); Gilles Garapon, Cholet (FR); Guillaume Buffard, Cholet (FR)

(73) Assignee: RACCORDS ET PLASTIQUES NICOLL, Cholet (FR)

( * ) Notice: Subject to any disclaimer, the term of this patent is extended or adjusted under 35 U.S.C. 154(b) by 42 days.

(21) Appl. No.: 17/847,240

(22) Filed: Jun. 23, 2022

(65) Prior Publication Data
US 2023/0045060 A1 Feb. 9, 2023

(30) Foreign Application Priority Data

Jul. 1, 2021 (FR) ...................... 2107155

(51) Int. Cl.
*F16L 17/03* (2006.01)
*F16L 25/14* (2006.01)

(52) U.S. Cl.
CPC ............. *F16L 17/032* (2013.01); *F16L 25/14* (2013.01)

(58) Field of Classification Search
CPC .......... F16L 17/032; F16L 25/14; F16L 21/03
See application file for complete search history.

(56) References Cited

U.S. PATENT DOCUMENTS

| | | | | |
|---|---|---|---|---|
| 1,292,524 A | * | 1/1919 | Serrell | F16L 17/032 285/8 |
| 1,486,777 A | * | 3/1924 | McWane | F16L 21/03 285/295.1 |
| 1,824,560 A | * | 9/1931 | McWane | F16L 21/03 285/295.2 |
| 3,018,785 A | * | 1/1962 | Adams, Jr. | F16L 17/032 137/107 |
| 3,493,236 A | * | 2/1970 | Kleindienst | F16L 17/032 285/379 |
| 4,318,547 A | * | 3/1982 | Ericson | F16L 25/14 285/27 |
| 5,711,536 A | * | 1/1998 | Meyers | F16L 17/032 277/606 |

(Continued)

FOREIGN PATENT DOCUMENTS

| | | | | |
|---|---|---|---|---|
| DE | 29905971 U1 | * | 7/1999 | ............ F16L 21/03 |
| EP | 0326719 A1 | * | 8/1989 | ............ F16L 17/032 |

(Continued)

*Primary Examiner* — Matthew Troutman
*Assistant Examiner* — Fannie C Kee
(74) *Attorney, Agent, or Firm* — 24IP Law Group USA, PLLC; Timothy R. DeWitt

(57) ABSTRACT

A coupling assembly comprising a socket (10) and an interchangeable ring mounted in the free end of the socket. The ring includes a ring body extending axially between a first, inner face (31) and a second, outer face (32) on the free end of the socket. The ring comprises an external seal (40) on the ring body provided in compression in the socket between the ring and the socket, and an internal seal for sealing between the ring and a pipe to be inserted, the internal seal having a lip which extends between an anchoring end on the second outer face and a free end.

10 Claims, 5 Drawing Sheets

(56) References Cited

U.S. PATENT DOCUMENTS

| | | | |
|---|---|---|---|
| 7,182,372 B2 * | 2/2007 | Wolff | F16L 21/03 285/374 |
| 2001/0052675 A1 * | 12/2001 | Gavin | F16L 21/03 277/606 |
| 2005/0242571 A1 * | 11/2005 | Houghton | F16L 21/03 277/626 |
| 2008/0048446 A1 * | 2/2008 | Houghton | F16L 17/032 285/374 |
| 2012/0175848 A1 * | 7/2012 | Leonard | F16L 21/03 277/624 |

FOREIGN PATENT DOCUMENTS

| | | | | |
|---|---|---|---|---|
| EP | 1757853 A3 | | 2/2007 | |
| GB | 1283489 A | | 7/1972 | |
| GB | 2588693 A | * | 5/2021 | ............ F16L 21/03 |
| LT | 3515 B | * | 11/1995 | ............ F16L 17/032 |
| WO | WO-2006112604 A1 | * | 10/2006 | ............ F16L 21/03 |
| WO | WO-2014081114 A2 | * | 5/2014 | ............ F16L 17/032 |
| WO | WO-2014186770 A1 | * | 11/2014 | ............ F16L 21/03 |
| WO | WO-2018185189 A1 | * | 10/2018 | ............ F16L 17/032 |

* cited by examiner

FITTING ASSEMBLY COMPRISING A SOCKET AND AN INTERCHANGEABLE RING

CROSS-REFERENCE TO RELATED APPLICATIONS

The present application claims priority of the French patent application FR 21/07155 filed on Jul. 1, 2021.

BACKGROUND OF THE INVENTION

Field of the Invention

The present invention relates to a fitting assembly comprising a socket and a ring, in particular for the discharge of connecting wastewater.

Brief Description of the Related Art

In the field of sanitary systems, sanitary appliances or water supply or drainage networks may have pipes, siphons, sockets, to be connected to other pipes, whose nominal diameters may vary according to the type of appliance, networks and the size of the expected flow.

For example, the siphons of sanitary appliances (sinks, washbasins) can be connected to a drainpipe, whose nominal diameter is generally 32 or 40 mm depending on the type of appliance and the size of the flow to be evacuated.

This has the disadvantage for the installer to generate a multiplication of the number of siphon models, and to anticipate the connection sections before the intervention on site.

Therefore, it is an object of the present invention to provide a connection assembly having an outlet suitable for different sizes of pipes to be connected, in order to reduce the number of products to be kept in stock. Another object of the invention is to provide a connection section assembly that allows easy installation with a limited number of parts and/or installation steps.

SUMMARY OF THE INVENTION

To this end, the present invention provides a coupling assembly comprising a socket and an interchangeable ring mounted in the free end of the socket. The ring includes a ring body extending axially between a first, inner face and a second, outer face on the free end of the socket. The ring comprises an external seal provided in compression in the socket between the ring and the socket for sealing between the ring and the socket, and an internal seal for sealing between the ring and a pipe to be inserted, the internal seal having a lip which extends between an anchoring end on the second outer face and a seal free end.

The present invention thus provides a socket with an interchangeable ring, which makes it possible to obtain a multi-diameter socket, the reduction in diameter being provided by the gasketed ring inserted at the socket end. Depending on the diameter of the pipe to be connected, it is sufficient to assemble the corresponding ring which will ensure the adaptation and the mountability. The external seal guarantees the tightness of the ring with the socket, and the internal seal, with a very flexible lip, can fit the connection pipe when it is inserted, for the tightness between the pipe and the ring.

According to one aspect, the second face has a shoulder projecting radially inwardly from the ring body, with a second face inner diameter less than the inner diameter of the ring body. In particular, the shoulder may have a shoulder outer wall on the pipe insertion side and a shoulder inner wall on the ring body side and forms a seal receiving space with the ring body. The shoulder helps guide the ring insertion. In addition, by forming a seal-receiving space, the shoulder allows providing a receiving space for the internal seal.

The anchoring end of the seal may be located against the inner wall of the shoulder and/or against the inner surface of the ring body adjacent to the inner wall of the shoulder, and the lip may extend at an angle toward the interior of the ring from the anchoring end. This allows the internal seal to extend and conform to the pipe to be inserted as the pipe is inserted, for sealing between the ring and the pipe. In addition, the shoulder prevents the internal seal from pulling back or retracting in the event of pipe withdrawal, by anchoring the internal seal against the shoulder and/or against the socket.

In addition, the locking of the pipe in the socket is ensured by the friction and orientation of the lip of the internal seal. Its inclination facilitates the introduction of the pipe and makes its removal difficult.

According to one aspect, a bead-like protrusion is provided at the free end of the internal seal, a compression sealing can be ensured in the zone of the bead.

According to one aspect, the external seal is of circumferential O-ring type with a single or multi-lobed seal profile between the inner face and means for fastening the ring in the socket, for example in a circumferential radial seal housing provided between the inner face and means for fastening the ring in the socket, for example against an intermediate stop of the ring body. A circumferential O-ring is provided on the outside diameter, co-injected or assembled, which will guarantee the sealing of these with the socket, by compression between the ring and the socket. The profile of this seal can be simple or multi-lobed to improve the sealing during assembly. The seal may be in a radial seal housing provided for this purpose, but the seal housing is not mandatory.

According to yet another aspect, the ring comprises a pipe centering device with at least one tab extending axially from the inner face, in extension of the ring body, the tab having at least one of the following features:
  the at least one tab is dimensioned so as not to impede the complete insertion of the ring into the socket, in particular up to an axial ring stop;
  the at least one tab is dimensioned to extend substantially to the pipe stop, with an assembly clearance between a pipe stop in the socket and the tab end;
  the diameter of the tab corresponds in the ring mounting position substantially to the diameter of the pipe to be inserted; and
  the at least one tab flares out in the extension of the ring body, before the ring is mounted in the socket.

Thus, the tab allows a reduction of diameter in the socket, to adapt to a pipe diameter smaller than the socket diameter.

The ring can be bi-injected with the internal seal and the external seal. Advantageously, the ring and the seals thus bi-injected are in a single piece, and it is not intended to provide a seal on the socket.

According to one aspect, the socket has a socket body, typically cylindrical and extending about a central axis X, with a socket inner diameter $D1$, which extends into a chamfered section of increasing chamfer inner diameter and terminates in a mouth. This geometry allows accommodating the interchangeable ring and defining zones for assembly of the ring and for sealing between the ring and the socket.

According to another aspect, the socket includes an axial ring stop, with the first inner face abutting the ring stop of the socket. In particular, the ring stop may be embodied at the end of the chamfered section at the mouth.

A staggered arrangement with variations in diameter and/or offset within the socket allows the pipe to be re-centered according to its diameter and to materialize a suitable fitting stop.

According to one aspect, the socket has a stepped geometry between the chamfered section and its free end, defining a sealing zone in which the external seal is positioned and an assembly zone in which means for fastening the ring in the socket are arranged, in particular wherein the sealing zone has a sealing zone inner diameter D2 and the assembly zone has an assembly zone inner diameter D3, greater than the sealing zone inner diameter D2. This allows the sealing zone to be axially offset from the assembly zone and preventing damage to the external seal when the ring is inserted into the socket.

BRIEF DESCRIPTION OF THE FIGURES

Further features and advantages of the present invention will be apparent from the description given below with reference to the attached drawings which illustrate a non-limiting embodiment thereof, of which FIGS. 1 to 9 listed below illustrate various aspects, in particular.

DETAILED DESCRIPTION OF THE INVENTION

Figure 1:
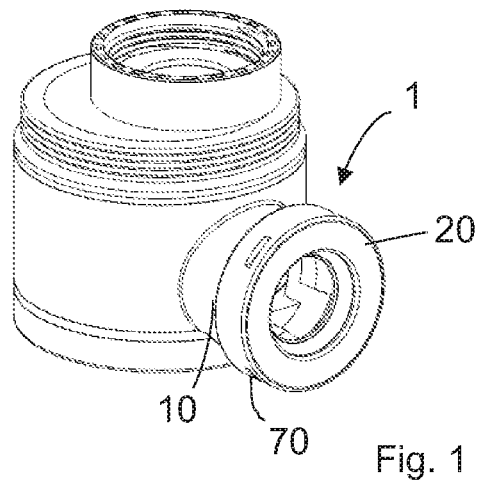
FIG. 1 illustrates a connection assembly according to one embodiment of the invention.

In the drawings, identical or similar elements are indicated with identical or similar reference numbers.

FIG. 1 illustrates a connection assembly 1 according to the present invention, for connecting a pipe.

The connection assembly 1 comprises a socket 10 and a ring 20. The ring 20 is interchangeable, in order to adapt the outlet diameter of the connection assembly 1 to different pipe diameters, as explained in the following.

Figure 4:
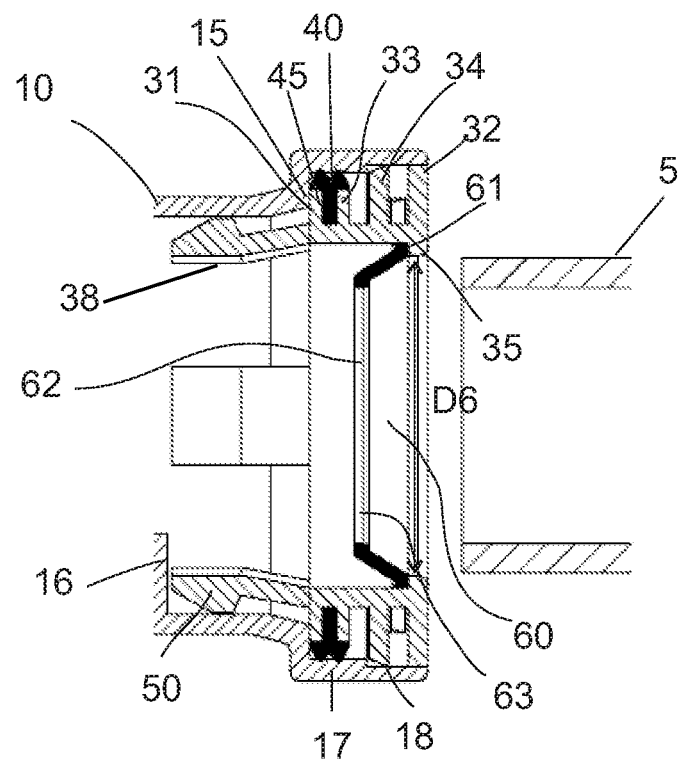
FIG. 4 illustrates a longitudinal sectional view of the connection assembly of FIG. 1 according to an embodiment of the invention.
Figure 5:
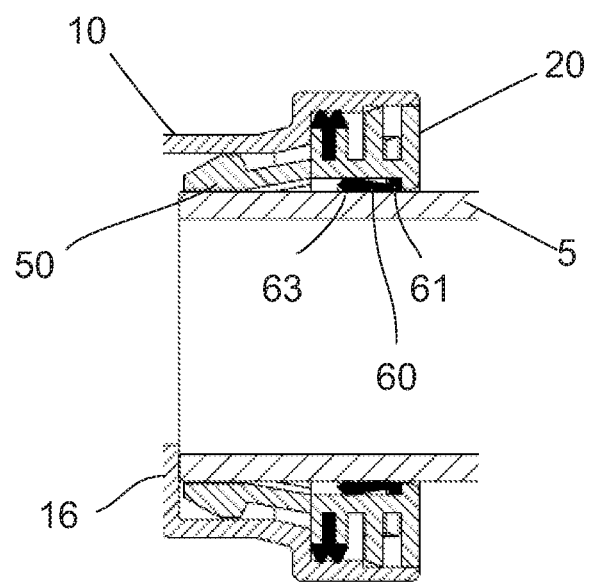
FIG. 5 illustrates a longitudinal sectional view of the connection assembly of FIG. 1 after insertion of a pipe, according to an embodiment of the invention.

In the example shown in FIG. 1, the ring is inserted partially into the socket, with a portion outside the socket. The ring can be inserted fully into the socket, as shown in FIGS. 4 and 5.

Figure 2:
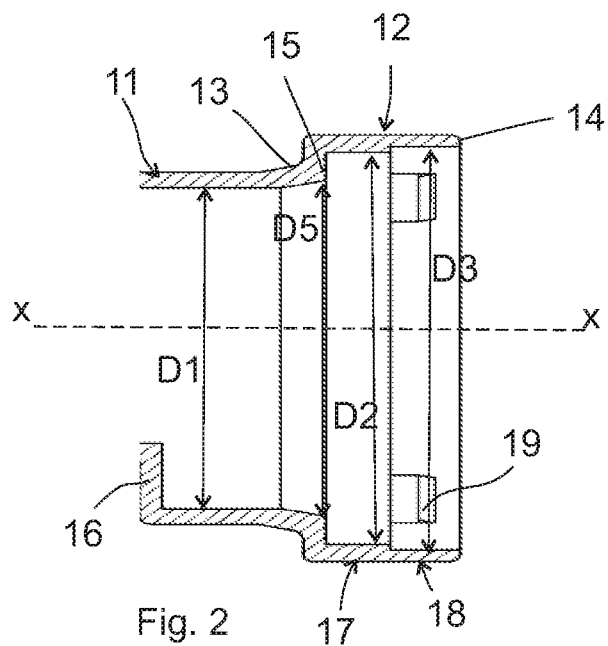
FIG. 2 illustrates a socket for use in the assembly of FIG. 1.

FIG. 2 is a longitudinal sectional view of the socket 10.

The socket has a socket body 11, typically cylindrical and extending about a central axis X, with an intern socket diameter D1. The socket body 11 extends into a chamfered section 13 of increasing chamfer inner diameter and terminates in a mouth 12, for mounting the ring and inserting the pipe.

The mouth 12 has a stepped geometry between the chamfered section 13 and its free end 14, defining a sealing zone 17 and an assembly zone 18.

The sealing zone has a sealing zone inner diameter D2 and the assembly zone has an assembly zone inner diameter D3, greater than the sealing zone inner diameter D2.

This stepped geometry makes it possible to materialize a ring stop 15, at the end of the chamfered section 13 at the mouth 12.

In addition, a pipe stop 16, in the form of a radial stop towards the interior of the socket body, is provided in the socket body 11, to stop the pipe during its insertion.

In the assembly zone 18, fastening means such as clips 19 are provided for clipping the ring 20. A clip assembly is an example of assembly of the ring in the socket. Of course, other assembly methods are possible, such as screwing or bayonet assembly.

The ring 20 is clipped into the socket and is detailed below, with reference to FIG. 3, which illustrates an example of a ring 20 in a first embodiment, for adaptation to a smaller pipe diameter. FIG. 4 shows a longitudinal section of the connection assembly 1 with the ring 20, before insertion of a pipe 5, and FIG. 5 shows a longitudinal section of the connection assembly 1 with the ring 20, after insertion of a pipe 5.

The ring 20 includes a hard, annular ring body 30 extending axially between a first face 31 and a second face 32.

The first face 31, also referred to as the inner face, is intended to abut against the ring stop 15 in the socket when the ring is inserted into the socket.

The second face 32, also called the outer face, is intended to form a rigid socket end stop.

In the illustrated example, the ring is completely inserted into the socket, but a protruding ring that protrudes from the socket is also possible.

The second face has a shoulder 35 projecting radially inward from the ring body, with a second face inner diameter D6 smaller than the inner diameter D1 of the mouth and/or an inner diameter D5 of the ring stop. The shoulder has an outer shoulder wall on the pipe insertion side and an inner shoulder wall on the ring body side.

This shoulder 35 is used to guide the insertion of the pipe into the socket. For this purpose, the outer shoulder wall can be bevelled, chamfered or rounded for the insertion of the pipe.

In addition, as will be explained later, the shoulder 35 makes it possible to create an internal seal receiving space 38, under the ring body 30 and against the inner wall of the shoulder 35.

A circumferential O-ring type seal 40 is provided in a circumferential radial seal housing 45 provided, between the inner face 31 and against an intermediate stop 33 defining a seal receiving stop to form the seal housing.

The seal 40 is provided to ensure the sealing of the ring 20 with the socket 10.

The seal 40 is a circumferential O-ring, with a single or multi-lobed seal profile, to improve the seal at the socket during assembly. The seal 40 has an outer diameter at least equal to the sealing zone diameter D2 and an inner diameter less than or equal to the socket body inner diameter D1.

The seal 40 may be co-injected with the ring or assembled onto the ring.

The ring body 30 includes, between the intermediate stop 33 and the outer face 32, a rod or clip 34, of height greater than the height of the seal housing 45.

The clip 34 is provided for clipping with the clips 19 in the socket.

In order to facilitate clipping of the ring, the clip 34 is a radial projection or rib outwardly of the ring, and its free end has an outer radial surface inclined toward the inner face. The clip 34 clips against stops in the socket. This slope assists in clipping into the assembly zone 18 of the mouth 12.

The radial projection of the clip 34 may be a groove around the entire outer circumference of the ring, to cooperate with corresponding stops on the socket. With this clipping mode, it is sufficient to push the ring into the socket until the clips engage, regardless of the orientation of the ring. There is no need for indexing or keying of the ring to ensure the correct positioning of the ring in the socket.

Note that the sealing zone 17 is axially offset from the assembly zone 18, which prevents damage to the external seal 40 when the ring is assembled in the socket.

In order to ensure a seal between the pipe that will be inserted and the socket, the ring 20 includes an internal seal 60.

The internal seal 60 is a flexible lip seal 60, which is intended to conform to the pipe as it is inserted.

The internal seal 60 has a lip that extends between an anchoring end 61 and a free end 62. The lip extends, radially inward and axially toward the inner face 31 of the ring, from the anchoring end 61 against the inner wall of the shoulder 35 and/or the wall 30 of the ring body adjacent to the shoulder. In other words, the internal seal 60 is inclined from the shoulder 35 and/or the inner face of the ring body towards the center and towards the inner face (towards the left in FIG. 4), i.e., axially in the direction of pipe insertion.

This inclination of the lip facilitates the introduction of the pipe and makes it difficult to remove.

In addition, the shoulder 35 prevents the seal 60 from turning over when the pipe is removed.

At the free end 62 of the internal seal 60, a bead-like protrusion 63 is provided. This bead 63 is provided to ensure the sealing between the pipe and the socket. Indeed, when the pipe 5 is inserted into the socket 10, the internal seal 60 is pushed by the pipe and stretches between the pipe and the ring body, to come to be positioned in the seal receiving space 38, provided under the ring body and against the shoulder 35. Thus, as can be seen in FIG. 5, in the final position of the pipe, the internal seal 60, and more precisely the bead 63, is compressed between the ring body 30 and the pipe 5.

Thus, sealing is achieved by compressing the bead 63 and stretching the material at the free end 62, where the inner diameter of the seal is smallest.

Thus, the internal seal 60 is held and locked at its anchoring end 61, by the shoulder 35. In addition, the shoulder 35 prevents the lip from receding and/or turning over in the event of pipe withdrawal.

It should be noted that pipe removal is more difficult than insertion.

In addition, the locking of the pipe in the socket is ensured by the friction and orientation of the internal seal lip.

The internal seal 60 can be co-injected with the ring or assembled onto the ring.

Unlike prior art assemblies, the ring and seal are one piece, and there is no provision for providing a seal on the socket. In addition, no nuts are required to secure the ring or seal to the pipe.

In particular, the ring can be molded in one piece, by a bi-injection process. The inner and external seals are preferably made of TPE, and the rest of the ring is made of polypropylene. This is a non-limiting example and other materials are possible.

This allows having both seals on the ring body, in a single piece.

A window 70 is visible in the assembly zone that results from molding the ring clips from the outside of the part via the mold cavity.

Another advantage of bi-injection is the possibility of material recycling.

Figure 3:
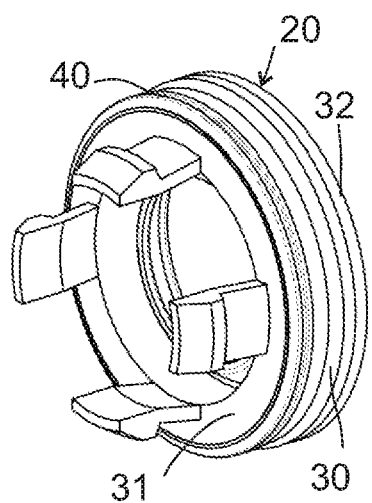
FIG. 3 illustrates a connecting ring for use in the assembly of FIG. 1.

In the example shown in FIGS. 3 to 5, tabs 50 extending axially from the inner face 31 are provided, in an extension of the ring body 30. In the example shown, the tabs 50, in the unmounted state of the ring, flare outwardly away from the ring body. Providing flared tabs is useful for molding and demolding the ring. This is because outwardly flared tabs 50 allow demolding without a collapsible core.

Figure 6A:
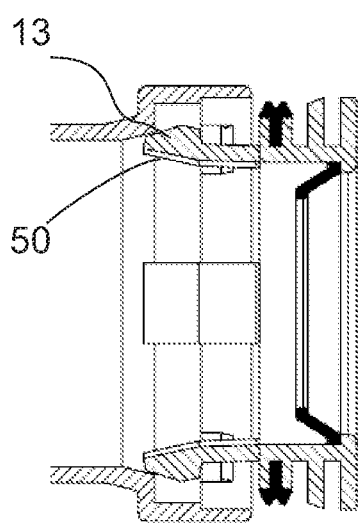
FIGS. 6A-6B illustrate the mounting of a ring in a socket of the connection assembly of FIG. 1 according to an embodiment of the invention.

The tabs 50 are then shaped inward when the ring is mounted on the socket, using the elasticity of the tabs. In the inwardly shaped position, the tabs 50 guide and maintain the coaxiality of the smaller diameter pipe in the socket. More precisely, when the ring 20 is inserted into the socket, as illustrated in FIG. 6, in particular 6A to 6B, the tabs 50 slide on the inner surface of the chamfered section 13 and of the socket body 11, to come to bear radially against the inner surface of the socket. In other words, the socket will shape the tabs 50, for subsequent adaptation to the pipe to be inserted.

Figure 6B:
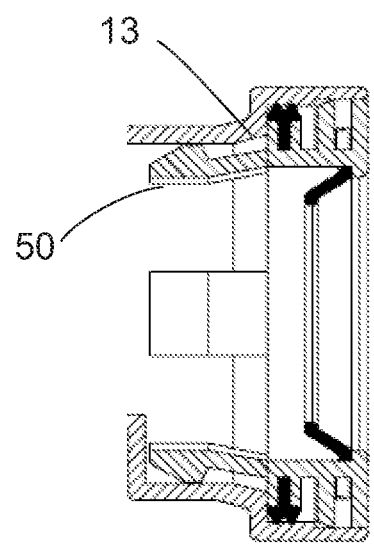

In order to facilitate the sliding of the tabs 50 during the insertion of the ring in the socket, the tabs 50 have a geometry with an inclination corresponding to the slope due to the difference in diameter between the two axial ends of the chamfered section, as well seen in FIG. 6B.

The tabs 50 allow compensating for the difference in diameter between the socket diameter and the diameter of the pipe to be inserted. They are used for centering and guiding the pipe and prevent the pipe inserted in the ring from being misaligned in the ring, and thus in the socket.

Once inserted, the tabs 50 are aligned and have a substantially constant diameter corresponding to the diameter of the pipe to be received.

Thus, the tabs are sized so as not to interfere with the complete insertion of the ring into the socket, up to the ring stop 15. Similarly, the tabs 50 are sized to extend substantially to the pipe stop 16, but with a clearance fit between the pipe stop 16 and the end of the tabs 50.

In the example of the figures, four tabs are shown, but the number of tabs is merely illustrative and not limiting. For example, a circumferential tab may be provided.

The tabs 50 can be omitted when the socket diameter and the diameter of the pipe to be inserted are substantially identical or the difference in diameter is not very large between the socket diameter and the diameter of the pipe to be inserted. This is the case, for example, in the embodiment of FIGS. 7 to 9, where there are no centering tabs.

Figure 7:
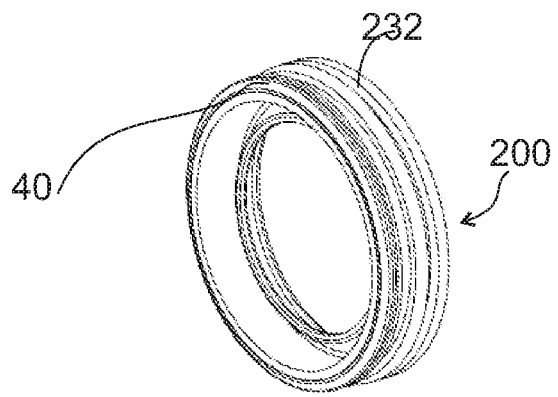
FIG. 7 illustrates another connecting ring for use in the assembly of FIG. 1.
Figure 8:
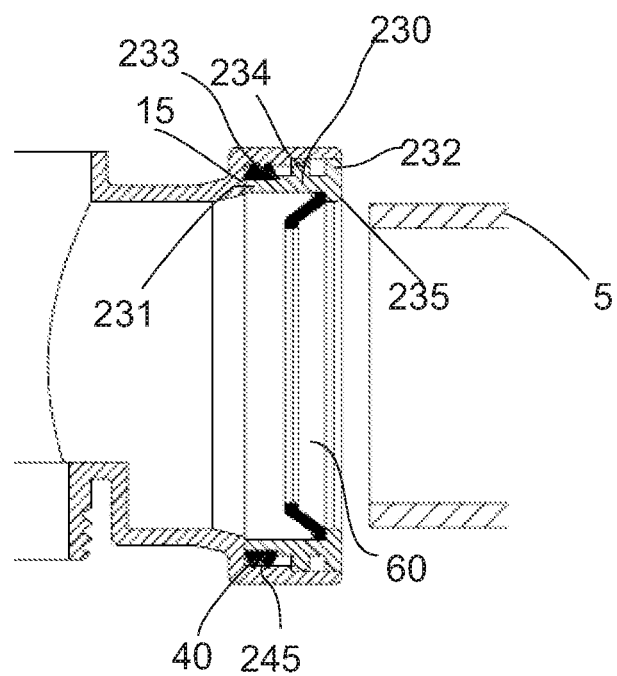
FIG. 8 illustrates a longitudinal sectional view in a connection assembly according to another embodiment of the invention.
Figure 9:
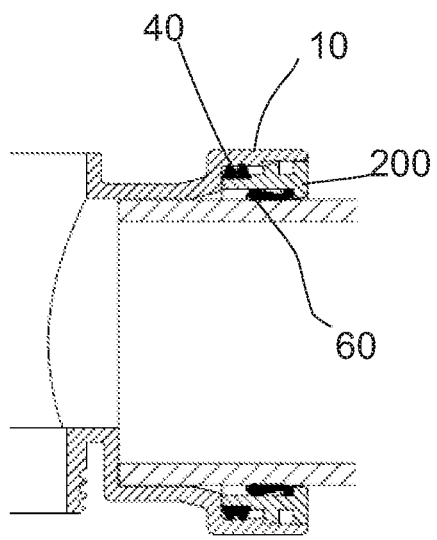
FIG. 9 illustrates a longitudinal sectional view of the connection assembly of FIG. 1 after insertion of a pipe, according to one embodiment of the invention.

Indeed, FIG. 7 illustrates an example of a ring 200 in a second embodiment, for adaptation to a smaller pipe diameter. FIG. 8 shows a longitudinal section of the connection assembly 1 with the ring 200, before insertion of a pipe 5, and FIG. 9 shows a longitudinal section of the connection assembly 1 with the ring 200, after insertion of a pipe 5.

The ring 200 in the second embodiment is substantially identical to the ring 20 in the first embodiment but differs from the ring 20 essentially in that it does not have a tab, since the pipe to be inserted can be guided or centered directly by the socket 10.

The ring 200 includes an annular ring body 230 extending axially between a first face 231 and a second face 232.

The second face 232 has a shoulder 235 projecting radially inwardly from the ring body, with a second face inner diameter D6 substantially equal to the socket body diameter D1. This shoulder 235 guides the insertion of the pipe into the socket.

The first face 231, also referred to as the inner face, is intended to abut against the ring stop 15 in the socket, when the ring is inserted into the socket.

A circumferential O-ring 40 is provided in a circumferential radial seal housing 245, against an intermediate stop 233. Thus, when the ring is clipped into the socket, the external seal 40 is housed between the ring stop 15 of the socket 10 and the intermediate stop 233 of the ring 200.

Similarly, the dimensions of the socket, including the clips and stops, have been adjusted to take into account the diameter of the pipe to be inserted. Thus, the height of the seal housing 245, of the clip 234, and of the outer face 232 is adjusted to accommodate the difference in diameter between the diameter of the socket and the diameter of the pipe to be inserted.

For example, the socket shown in FIG. 2 can be a sanitary appliance trap socket designed for connection to a drain pipe with a nominal diameter of 32 mm or a pipe with a nominal diameter of 40 mm, depending on the type of appliance and the size of the flow to be evacuated. The socket has a diameter of 40.2 mm.

For a pipe to be connected with a nominal diameter of 32 mm, the ring shown in FIG. 2 can be used. For example, once the ring is inserted, the tabs define a diameter of 32.2 mm. Similarly, the shoulder 35 has a diameter of 32.2 mm. The ring body has an intern diameter of 35 mm, to provide the seal receiving space under the ring body and against the shoulder.

In the example of FIGS. 7 through 9, the ring 200 is intended to join a pipe of nominal diameter 40 mm. In this case, the radial seal receptacle is less high/deep and there is no need to provide the centering tabs. The shoulder 235 has a diameter of 40.2 mm, which is the same as the intern diameter of the socket body. The ring body has an intern diameter of 43 mm.

The socket assembly may be provided in which the socket and ring are pre-assembled.

This may allow for ease of field operations. There is no specific orientation, neither for the ring in the socket, nor for the pipe in the ring. The assembly is simple and allows to limit the number of parts and steps.

Otherwise, it is possible to provide a socket and ring sets, to be changed according to the diameter of the pipes to be connected.

Examples of dimensions are given in the previous description for sanitary traps. Of course, this example is not limiting. The socket assembly according to the present application can be applied to any type of socket for various applications.

This invention is not limited to the example embodiment described above but encompasses all variations thereof. In particular, a feature illustrated and/or described in combination with other features may be provided independently or in combination with other features illustrated independently or in combination with other features, respectively, independently or in arbitrary combination.

What is claimed is:

1. A coupling assembly comprising a socket and an interchangeable ring mounted in a free end of the socket,
   wherein the interchangeable ring comprises a ring body extending axially between a first, inner face and a second, outer face on the free end of the socket,
   wherein the ring comprises an external seal on the ring body provided in compression in the socket, between the ring and the socket, and
   the ring comprises an internal seal for sealing between the ring and a pipe to be inserted, the internal seal having a lip which extends between an anchoring end on the second outer face and a free end,
   wherein the external seal is a circumferential seal with a single or multi-lobed seal profile, between the inner face and means for fastening the ring in the socket, wherein a circumferential radial seal housing is provided between the inner face and the means for fastening the ring in the socket, and wherein the circumferential radial seal housing is against an intermediate stop of the ring body.

2. The assembly according to claim 1, wherein at the free end of the internal seal, a protrusion is provided.

3. The assembly according to claim 1, wherein the ring comprises a pipe centering device with at least one tab extending axially from the inner face, the at least one tab extending from the ring body, the at least one tab having at least one of the following features:
   the at least one tab is dimensioned so as not to impede the complete insertion of the ring into the socket up to an axial ring stop;
   the at least one tab is dimensioned to extend substantially to a pipe stop, with a joining clearance between the pipe stop in the socket and a tab end;
   in the assembly position of the ring, a diameter of the at least one tab corresponds substantially to a diameter of the pipe to be inserted; and
   the at least one tab flares in an extension of the ring body, before the ring is mounted in the socket.

4. The assembly according to claim 1, wherein the ring is bi-injected with the internal seal and the external seal.

5. The assembly according to claim 1, wherein the socket has a socket body extending about a central axis, with a socket inner diameter, which extends into a chamfered section of increasing chamfer inner diameter and is terminated by a mouth.

6. The assembly according to claim 5, wherein a ring stop is embodied at an end of the chamfered section, at the mouth.

7. The assembly according to claim 5, wherein the mouth has a stepped geometry between the chamfered section and the free end of the socket, defining a sealing zone in which the external seal is positioned and an assembly zone in which means for fastening the ring in the socket are arranged, wherein the sealing zone has a sealing zone inner diameter and the assembly zone has an assembly zone inner diameter, which is greater than the sealing zone inner diameter.

8. The assembly according to claim 5, wherein the socket has a cylindrical socket body.

9. The assembly according to claim 1, wherein the socket includes an axial ring stop, with the first inner face abutting the ring stop of the socket.

10. The assembly according to claim 1, wherein the second face has a shoulder projecting radially inwardly from the ring body, with a second face inner diameter less than a ring body inner diameter.

\* \* \* \* \*